United States Patent [19]

Atwell

[11] 4,285,776
[45] Aug. 25, 1981

[54] DESALATION SYSTEM

[76] Inventor: George Atwell, 891 St. Gabriel Ave., St. Norbert, Manitoba, Canada

[21] Appl. No.: 91,704

[22] Filed: Nov. 6, 1979

[30] Foreign Application Priority Data

May 17, 1978 [GB] United Kingdom ............... 20135/78

[51] Int. Cl.³ .............................................. B01D 3/02
[52] U.S. Cl. ....................................... 202/187; 159/3; 202/205; 202/236
[58] Field of Search ........ 159/22, 24 A, 46, DIG. 32, 159/3, 1 RW, 1 S, 1 SF; 203/10, 11, 90, DIG. 1, DIG. 17; 202/177, 167, 205, 233, 234, 187, 235, 236

[56] References Cited

U.S. PATENT DOCUMENTS

| | | | |
|---|---|---|---|
| 3,278,396 | 10/1966 | Parson | 202/234 |
| 3,312,600 | 4/1967 | Morton | 202/177 |

*Primary Examiner*—Frank Sever
*Attorney, Agent, or Firm*—Stanley G. Ade

[57] ABSTRACT

Salinated or other contaminated water is fed to a chamber and sprayed into an evaporation chamber that is maintained at a relatively low pressure by means of a vacuum pump or the like. This evaporates the water so that desalinated water vapor is drawn out through the pump and discharged into a collection chamber at a higher pressure whereupon it condenses and may be discharged into a storage area The solids removed by the evaporation of the water collect at the base of the evaporation chamber and can be removed periodically through an air lock.

3 Claims, 2 Drawing Figures ated by reference character 20. It is driven by a motor 20A connected to a source of electrical energy via cables 20B.

DESALATION SYSTEM

BACKGROUND OF THE INVENTION

This invention relates to new and useful improvements in desalination systems or systems in which vacuum evaporation of a liquid enables fresh water to be extracted from the contaminated water source such as sea water, sewage or the like.

While it is known to use evaporation methods facilitated by vacuum, nevertheless such devices are normally quite inefficient, and the principal advantage of the present invention is to overcome these inefficiencies and produce an economical, low cost operating and relatively efficient plant.

SUMMARY OF THE INVENTION

In accordance with the invention there is provided a desalination system for contaminated water comprising in combination a sealed enclosure, an evaporation chamber within said enclosure, a vacuum pump connected between said evaporation chamber and said enclosure and means conveying the contaminated water to the interior of said evaporation chamber, evaporated water vapour passing through said vacuum pump and condensing within said enclosure externally of said evaporation chamber and discharge means in said enclosure for the condensed water collected therein.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
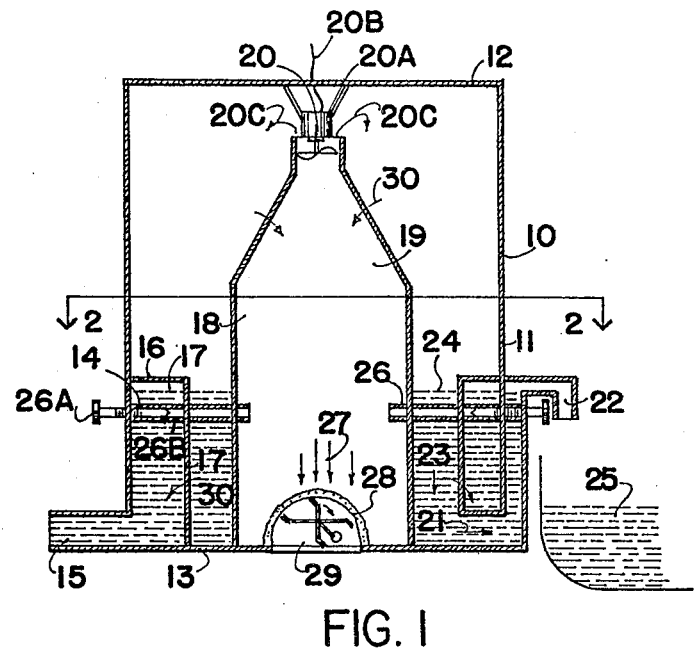
FIG. 1 is a schematic vertical cross sectional view of the preferred embodiment.
Figure 2:
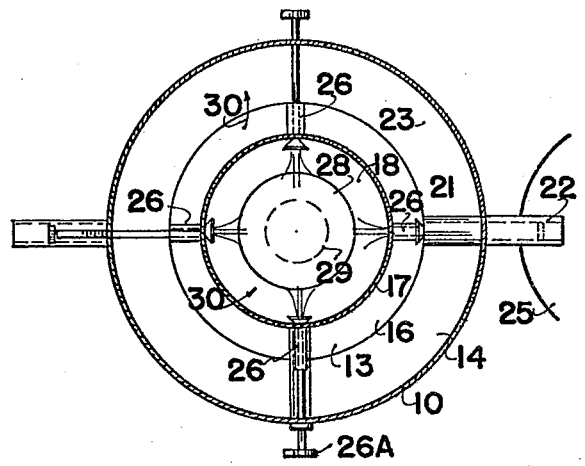
FIG. 2 is a horizontal section of FIG. 1.

Proceeding therefore to describe the invention in detail, reference character 10 illustrates schematically, a substantially cylindrical housing preferably insulated and including the vertical surrounding wall 11, an upper wall 12, and a base 13. An annular tank 14 is formed within the lower part of the enclosure 10 and is adapted to receive contaminated water such as salt water, through an inlet 15 adjacent the base thereof and it will be observed that this tank is sealed on the upper side by means of upper wall 16. An annular inner wall 17, together with a portion of the casing 10, defines the annular chamber 14 and the speed of intake through the inlet 15, is such that the level of the water within the tank is substantially as shown by reference character 17A although it could be varied depending upon design.

A substantially cylindrical evaporation chamber 18 is situated within the enclosure 10 preferably centrally thereof, and within the space defined by the annular tank 14. This extends from the base 13 upwardly to adjacent the upper side 12 and it is preferable that the portion of this evaporation tank be frustro-conical as indicated by reference character 19.

A vacuum pump such as a multi-staged turbo blower is situated at the upper end of the evaporation chamber 18 and is indicated schematically by reference character 20. It is driven by a motor 20A connected to a source of electrical energy via cables 20B.

A discharge conduit 21 extends from the annular space between the evaporation tank 18 and the tank 14, and a discharge 22 as clearly illustrated, it being understood that this annular space indicated by reference character 23, is the fresh water collection area and that this fresh water level 24, is maintained by the position of the discharge 22, to a convenient collection and storage area such as indicated by reference character 25, exteriorly of the device.

A source of heat (not illustrated) may be provided to pre-heat the water entering the inlet 15 and in this connection, solar heat could be used advantageously, it being understood that the warmer the intake water, the more efficient will the system be and the less energy required.

Also to be observed is a plurality of substantially horizontal conduits or pipes 26 extending from the storage tank 14, horizontally across the area 23 and into the evaporation chamber 18 so that the head of water within tank 14, forces the salt water or the like to enter the evaporation chamber through the conduits 26 to be expelled substantially horizontally, across the evaporation chamber in a spray fashion thus presenting the greatest surface area to the vacuum formed within the evaporation chamber by operation of the vacuum pump 20. If, desired, needle valves 26A may be incorporated within each of the pipes 26, to control the amount of water passing into the pipes 26 from the annular tank 14 via inlet apertures 26B. These needle valves are screw threadably engaged within the outer ends of pipes 26 and extend through the wall of the enclosure 10.

The action of the vacuum, evaporates the sprayed water so that fresh water vapour moves upwardly through the pump 20 while solids such as salt in a relatively dry form, drop downwardly as indicated by arrows 27 to be collected at the base of the evaporation chamber as indicated by reference character 28. A conventional lock system shown substantially at 29 may be provided at the base of the evaporation chamber and extend to the outside of the enclosure 10 so that the solids may be removed from time to time. The water vapour is discharged from the vacuum pump into the outer chamber as indicated by arrows 20C.

The fresh water vapour passing through the vacuum pump 20, condenses within the outer chamber and fails to be collected within the area 23 surrounding the evaporation chamber whereupon it passes through the discharge 22, to the collection area 25. It will be understood that the vacuum pump maintains a pressure below atmosphere in chamber 18 and a pressure above atmospheric pressure in the collection area 23.

Heat exchange is shown by arrows 30 and the material used for the construction of the device should facilitate this heat exchange. If desired, a heat transfer grid of copper, bronze or the like can be situated within the chambers to facilitate the heat transfer and assist in stabilization of the temperature in all chambers. This heat transfer grid is shown substantially by reference character 30.

The system is automatic and continuous in operation and is extremely efficient, particularly if pre-heating of the intake water can take place due to solar action.

Since various modifications can be made in my invention as hereinabove described, and many apparently widely different embodiments of same made within the spirit and scope of the claims without departing from such spirit and scope, it is intended that all matter contained in the accompany specification shall be interpreted as illustrative only and not in a limiting sense.

What I claim as my invention:

1. A desalination system for contaminated water comprising in combination a sealed enclosure, an evaporation chamber within said enclosure, a vacuum pump connected between said evaporation chamber and said enclosure for maintaining constant negative pressure within said chamber and means conveying the contaminated water to the interior of said evaporation chamber, evaporated water vapour passing through said vacuum pump and condensing within said enclosure externally of said evaporation chamber and discharge means in said enclosure for the condensed water collected therein, said evaporation chamber being concentrically located within said enclosure, said means conveying the contaminated water to said evaporation chamber including a tank within said enclosure surrounding said evaporation chamber and spaced therefrom, means to selectively remove solids from the base of said evaporation chamber while substantially maintaining said constant negative pressure, said last mentioned means taking the form of an air lock communicating between said evaporation chamber and externally of said enclosure and maintaining a seal to said evaporation chamber.

2. The invention according to claim 1 in which said means conveying the contaminated water to the interior of said evaporation chamber includes at least one conduit extending through the wall of said evaporation chamber and connected to a supply of contaminated water and means to adjust the discharge of contaminated water within said evaporating chamber.

3. The invention according to claims 1 or 2 in which said means to adjust the discharge of contaminated water within said evaporating chamber consists of a needle valve assembly operatively connected to said conduit and extending through the wall of said enclosure for external adjustment thereof, an entrance aperture in said conduit, said needle valve controlling the effective size of said aperture and hence the quantity of water passing therethrough.

* * * * *